United States Patent [19]

Asrar

[11] Patent Number: 5,219,966

[45] Date of Patent: Jun. 15, 1993

[54] NORBORNENE DICARBOXIMIDE POLYMERS

[75] Inventor: Jawed Asrar, Wilbraham, Mass.

[73] Assignee: Monsanto Company, St. Louis, Mo.

[21] Appl. No.: 706,480

[22] Filed: May 28, 1991

Related U.S. Application Data

[62] Division of Ser. No. 196,992, May 20, 1988, abandoned.

[51] Int. Cl.$^5$ .................... C08F 122/40; C08F 126/06
[52] U.S. Cl. ...................................... 526/262; 526/259
[58] Field of Search .............................. 526/259, 262

[56] References Cited

U.S. PATENT DOCUMENTS 3,959,234  5/1976  Kurosawa et al. ................... 260/78

FOREIGN PATENT DOCUMENTS 1594934  7/1970  France .

*Primary Examiner*—Joseph L. Schofer
*Assistant Examiner*—Wu C. Cheng
*Attorney, Agent, or Firm*—Thomas E. Kelley; Richard H. Shear

[57] ABSTRACT

Polymerization of N-methyl norbornene dicarboximide yields polymers of high Tg, e.g. greater than 200° C. Preferred polymers of exo N-methyl norbornene dicarboximide have number average molecular weight of at least 8,000.

2 Claims, 1 Drawing Sheet

EXO STEREOISOMER

ENDO STEREOISOMER

EXO STEREOISOMER

ENDO STEREOISOMER

NORBORNENE DICARBOXIMIDE POLYMERS

This is a division of application Ser. No. 07/196,992, filed May 20, 1988 now abandoned.

BACKGROUND

Disclosed herein are inventions relating to high temperature-resistant thermoplastic polymers of norbornene dicarboximides and to methods of making and using such polymers. More particular aspects include inventions relating to polymers of N-methyl norbornene dicarboximide.

High temperature resistance, e.g. as measured by heat distortion temperature and glass transition temperature ($T_g$), is provided in several existing polymer systems, e.g. the polyether imides and the polyamide-imides. In addition to high strength and high modulus, a desirable characteristic of such polymer systems includes processability like more conventional lower temperature thermoplastic polymers.

McKeon et al. in U.S. Pat. No. 3,330,815 disclose the vinyl-type addition polymerization of a variety of norbornene derivatives, including carboximides, to provide polymers free of unsaturation in the chain. Such polymerization is carried out with noble metal catalyst, i.e. palladium compounds.

Reding et al. in U.S. Pat. No. 3,494,897 disclose the vinyl-type addition polymerization including copolymerization with alkenes, of a variety of norbornene derivatives to provide polymers of saturated chains. Such polymerization of copolymers of norbornene derivatives including dicarboximides (see for instance Examples 24 and 25) is carried out in the presence of a free-radical catalyst, e.g. a peroxide.

See also French Brevet d'invention 1,594,934 which discloses polymerization of norbornene dicarboximides with noble metal catalyst, e.g. ruthenium compounds. Analyses reported by Michelotti et al. in

*Journal of Polymer Science* 3 (1965) pp. 895–905 suggest that ruthenium catalysts may effect polymerization to some extent through a bicyclic double bond without ring opening (see Michelotti et al. at p. 902).

Such noble-metal-catalyzed imide polymers as reported in Brevet 1,594,934 have somewhat low glass transition temperatures (Tg). See, for instance, Example 2 which reports the preparation of a polymer of N-methyl norbornene dicarboximide having a Tg of 185° C. See also Example 14 which reports the preparation of a polymer of N-phenyl norbornene dicarboximide having a Tg of 162° C.

Kurosawa et al., in U.S. Pat. No. 3,959,234 disclose the ring-opening polymerization of norbornene dicarboximides with a catalyst system comprising organic aluminum compounds and tungsten and/or molybdenum compounds. However, multiple polymerization mechanisms may have been involved perhaps due to contaminated catalyst since the tungsten-catalyzed polymers of the working examples are reported as having Tg's similar to the noble metal-catalyzed polymers reported in Brevet 1,594,934. In this regard in the U.S. patent poly (N-methyl norbornene dicarboximide) is reported to have a Tg of 189° C.; in the Brevet a Tg of 185° C. is reported. Similarly, in the U.S. patent poly (N-phenyl norbornene dicarboximide) is reported to have a Tg of 166° C.; in the Brevet the Tg is 162° C.

Other attempts at the metathesis ring-opening polymerization of norbornene dicarboximides have met with apparently limited success. For instance, see Matsumoto et al. at *ACS Symposium Series* 59 (1977), page 303, who report poor polymer yield (i.e. about 8 percent) in attempts to polymerize monomers of norbornene dicarboximide and N-propyl norbornene dicarboximide. The preparation of monomers by Matsumoto et al. suggests that endo stereoisomers of the dicarboximides were used. Related work by Matsumoto is found in U.S. Pat. No. 4,039,491, e.g. in Example 20, where low molecular weight polymers of N-propyl norbornene dicarboximide were apparently obtained especially since polymerization was carried out in the presence of 1-hexene, a molecular weight limiting material.

High molecular weight polymers of N-phenyl norbornene dicarboximide are disclosed in my copending application Serial No. 07/067,562, filed Jun. 26, 1987 now abandoned.

SUMMARY OF THE INVENTION

By this invention I have provided high temperature-resistant polymers comprising the exo stereoisomer of N-methyl norbornene dicarboximide (exo NMD) of sufficiently high molecular weight as to exhibit desirable properties of high strength and modulus and processability whether provided as a homopolymer, a copolymer, a graft copolymer or a blend. In a preferred aspect of my invention I have provided homopolymers of NMD having surprisingly high Tg, e.g. greater than 200° and in many cases greater than 215° C.

I have also discovered that the endo stereoisomer of N-methyl norbornene dicarboximide (endo NMD) is difficult to polymerize. Yet endo NMD can be polymerized in mixtures with exo NMD, yielding low molecular weight polymers of exceptionally high $T_g$, e.g. about 230–240° C.

DETAILED DESCRIPTION OF THE INVENTION

Throughout this specification, percentages of compositions are by weight and temperatures in degree Celsius, unless indicated otherwise. "Tg" as used herein means the glass transition temperature of a polymer which is determined at the mid-point of the inflection in the glass transition region during differential scanning calorimetry at a heating rate of 20° C./min. The Tg of the polymer is determined by placing a sample of the polymer in an aluminum calorimeter pan in a differential scanning calorimeter (e.g. a Perkin-Elmer DSC 4), preheating to a temperature above the glass transition temperature and rapidly cooling with liquid nitrogen to less than 30° C.; the Tg is then determined by heating at 20° C./min.

Figure 1:
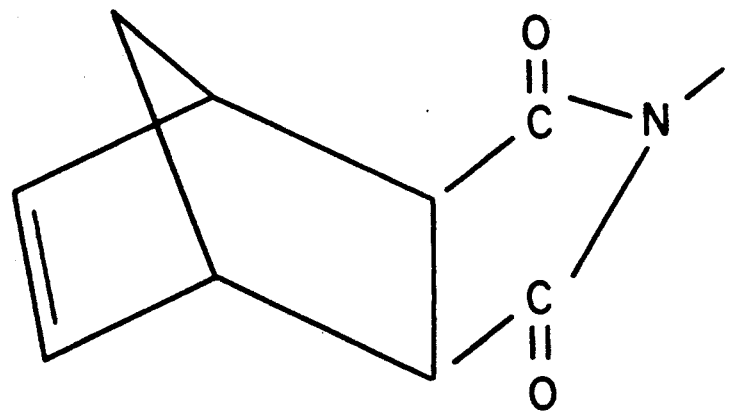
FIG. 1 structurally illustrates the stereoisomeric forms of norbornene dicarboximide monomers.
Figure 1:
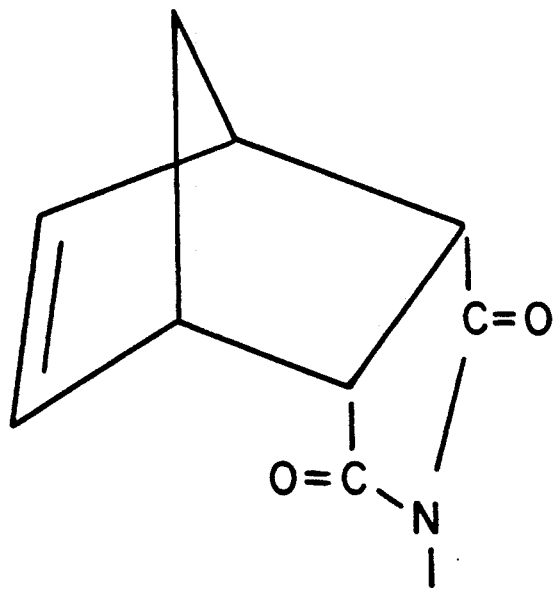

In the following disclosure of my inventions reference is made to the "endo" and "exo" stereoisomeric forms of the norbornene dicarboximide monomers. As used herein, the term "endo" refers to the stereoisomeric form of the monomer such as norbornene dicarboximide or norbornene dicarboxylic anhydride in which the carbonyl groups are cis with respect to the double bond which is opened during metathesis polymers. As illustrated in FIG. 1, in the endo isomer the carbonyl groups and double bond are both on the same side of the surface of the saturated five-membered ring of the monomer. As used herein, the term "exo" refers to the stereoisomeric form of such monomers in which the carbonyl groups are trans with respect to the double bond. Again, as illustrated in FIG. 1, the carbonyl groups and double bond are on opposite sides of the surface of the saturated five-membered ring of the monomer.

Number average molecular weights (Mn) reported herein were determined by size exclusion chromatography (SEC) with samples of polymer dissolved in chloroform. Filtered (0.45 micrometer) samples (100–200 ml) were passed at a flow rate of 1 ml/min. in four ASI Vetragel SEC columns ($10^6$, $10^5$, $10^4$, $10^3$ Angstrom packing). Fractions were compared against polystyrene standards in a Waters Model 401 differential refractive index detector. Molecular weight determinations were made by a Perkins Elmer Model 7500 GPC 6 data acquisition system.

Polymers of this invention can be illustrated as comprising monomer units of the structural formula

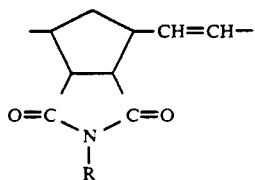

where R is methyl or substituted methyl such as chloromethyl and the like. The polymers of this invention can comprise homopolymers, or substantially homopolymers, of such norbornene dicarboximides. Alternatively, the polymers of this invention can comprise copolymers of such norbornene dicarboximides, including copolymers with other metathesis norbornene derivative monomers such as 5-norbornene, norbornene nitrile, norbornene dicarboxylic anhydride and the like, or with other copolymerizable monomers such as cycloolefins, e.g. cyclopentene, cycloheptene, cyclooctene, tetracyclododecene, etc. Similarly, the polymers of this invention can comprise block copolymers or graft copolymers of such norbornene dicarboximides, e.g. graft copolymers of norbornene dicarboximide on polymeric rubber substrates such as polybutadiene or nitrile rubber.

The polymers of this invention are provided as thermoplastic polymers of sufficiently high molecular weight, e.g. homopolymers of exo NMD as illustrated below in Example 9 having a $M_n$ of 12,000 or higher, will have a $T_g$ of 200° or higher. Preferred polymers useful as engineering thermoplastics will have a $M_n$ of 20,000 or higher.

The norbornene dicarboximide monomers are advantageously derived from monomers of norbornene dicarboxylic acid anhydrides. Such monomers are readily prepared through Diels-Alder reaction of cyclopentadiene and maleic anhydride by methods that are well known, e.g. as disclosed in U.S. Pat. No. 4,022,954, incorporated herein by reference. In this regard, I have discovered that the Diels-Alder reaction product of cyclopentadiene and maleic anhydride is substantially the endo stereoisomer. This endo stereoisomer can be converted to a predominately exo stereoisomer by heating and recrystallization, e.g. by well-known procedures such as disclosed by Castner et al. in *Journal of Molecular Catalysis* 15, (1982) 47–59. For instance, in the case of norbornene dicarboxylic anhydride heating at about 198° for about two hours provides a molten equilibrium mixture of about 45 percent endo stereoisomer and about 55 percent exo stereoisomer. Predominately exo stereoisomer of NDA can be recovered by selective crystallization from a solvent such as toluene. Through multiple recrystallizations substantially high levels of the exo stereoisomer can be recovered, e.g. at least about 85 percent or higher, even up to substantially 100 percent.

Norbornene dicarboximides can be prepared by reacting norbornene dicarboxylic anhydride with a primary amine, e.g. methyl amine, providing an amic acid which can be readily imidized.

Norbornene dicarboximide monomers comprising a sufficient amount of the exo stereoisomer, e.g. at least about 17 percent or higher of the exo stereoisomer, are readily polymerized by ring opening catalysts of the type used to polymerize norbornene monomers. A preferred catalyst comprises the reaction product of tungsten hexachloride and an acetal, e.g. 1,1-diethoxyethane. Preferably, the polymerization reaction mixture will also contain an aluminum alkyl activator such as diethyl aluminum chloride, triisobutyl aluminum or the like. The polymerization reactants should be kept dry and free of contaminants, e.g. oxygen, that may undesirably react with the catalyst and/or activator. Polymerization can be carried out in bulk, i.e. in molten monomer, or in a solution of monomer.

The polymers of this invention recovered from such polymerization solutions can be advantageously provided in a desired product form by conventional thermoplastic processing, e.g. by injection molding.

The following disclosure is provided to illustrate specific embodiments and aspects of the polymers of this invention but is not intended to imply any limitation of the scope of this invention.

EXAMPLE 1

This example illustrates the preparation of predominately exo norbornene dicarboxylic anhydride (NDA).

3500 g of endo NDA was heated at 198° C. for 2 hours. 3.5 liters of toluene was added to molten NDA to provide a solution of NDA in toluene which was allowed to cool under a nitrogen atmosphere resulting in the precipitation of about 2,200 g of NDA. The NDA crystals were redissolved in 3 liters of toluene. The resulting solution was cooled under nitrogen producing about 1,200 g of NDA which comprised about 85 percent of the exo stereoisomer.

EXAMPLE 2

This example serves to illustrate the preparation of the substantially exo NMD.

About 90 ml of methyl amine (40% solution in water) was added to about 164 g of exo NDA (1 molar solution in toluene) prepared essentially as indicated in Example 1. With stirring the mixture rose from room temperature to and was held at about 60° for about one hour. Water was removed by azeotropic distillation with toluene; then toluene was evaporated. Crystals, formed when the liquid was cooled, were filtered and dried in a vacuum oven at 45° for about 16 hours. NMR analysis indicated the recovered crystals as exo.NMD (melting point: 106°).

EXAMPLE 3

This example illustrates the preparation of the substantially endo NMD.

The procedure of Example 2 was essentially repeated except that the substantially endo stereoisomeric form of NDA was utilized to produce substantially endo NMD (melting point: 107°).

EXAMPLE 4

This example serves to illustrate the polymerization of exo NMD.

4.4 g of exo NMD was dissolved in 9 ml of 1,2-dichloroethane in a reaction vial. After the NMD was dissolved, 0.26 ml of catalyst solution comprising 0.5 M tungsten hexachloride-acetal (mole ratio 1:2) in toluene and 0.38 ml of activator solution comprising 2.05 M diethyl aluminum chloride in heptane were added. The reaction mixture was held at 60° for 4 hours. The reaction product of poly(exo NMD) was precipitated in methanol and dried in a vacuum oven. Yield was about 4.4 g of poly(exo NMD) exhibiting a number average molecular weight $M_n$ of about 25,000 and a weight average molecular weight $M_n$ of about 55,000 and a $T_g$ of 220°.

EXAMPLE 5

This example serves to further illustrate the polymerization of exo NMD using other transition metal catalyst solutions.

0.4 ml of ruthenium trichloride trihydrate solution (0.03 g in 20 ml of butanol) was added to a reaction vial containing 2 g of exo NMD; polymerization was carried out at 110° for 5 hours, yielding a polymer which was dissolved in methylene chloride, precipitated in methanol and dried. The recovered polymer exhibited a $T_g$ of 216° and a of about 230,000.

2 ml of osmium trichloride solution (0.04 g in 2 ml of chlorobenzene and 2 ml of ethanol) was added to a reaction vial containing 2 g of exo NMD; polymerization was carried out at 65° for 18 hours, yielding a polymer which was dissolved in 1,2-dichloroethane, precipitated in methanol and dried at 60° for 18 hours. The recovered polymer exhibited a Tg of 219° and a of about 150,000.

2 ml of iridium trichloride solution (0.04 g in 2 ml of chlorobenzene and 2 ml of ethanol) was added to a reaction vial containing 2 g of exo NMD; polymerization was carried out at 65° for 18 hours, yielding a polymer which was dissolved in 1,2-dichloroethane, precipitated in methanol and dried at 60° for 18 hours. The recovered polymer exhibited a $T_g$ of 197° and a $M_n$ of about 245,000.

EXAMPLE 6

This example serves to illustrate the bulk polymerization of exo NMD.

0.15 ml of 0.5 M tungsten hexachloride ™ acetal (as prepared in Example 4) and 0.25 ml of diethyl aluminum chloride were added to 3 g of exo NMD. The mixture was heated to 110°; after the solid exo NMD melted, polymerization occurred. Polymer, extracted from methanol, exhibited a $M_n$ of about 45,000 and a $T_g$ of about 213°

EXAMPLE 7

This example serves to illustrate the polymerization of mixtures of endo and exo NMD.

Reaction vials were filled with mixtures of the endo and exo NMD dissolved in dichloroethane (3 g NMD per 2 ml) in the proportions indicated in Table 1. Each vial was injected with 0.15 ml of the tungsten hexachloride-acetal catalyst solution and 0.25 ml of the diethyl aluminum chloride activator solution used in Example 4. The vials were held at about 65° for about 14 hours. The contents of each vial were poured into methanol to precipitate polymer which was filtered and dried. The yield of each polymerization reaction is reported in Table 1 together with the $M_n$, $T_g$ and endo-content of the polymer. The results reported in Table 1 indicate that when high polymer yields and high molecular weight polymers are desired, it is advantageous to provide the NMD in the exo stereoisomeric form at levels of at least about 20 percent.

TABLE 1

Polymerization of Mixtures of Exo and Endo NMD

| Endo Isomer (wt. percent) | | Polymer Yield* | $M_n$ | $T_g$ |
|---|---|---|---|---|
| Monomer | Polymer | | | |
| 0 | 0 | 100% | 24,500 | 221 |
| 33 | 21 | 67% | 12,500 | 228 |
| 50 | 28 | 67% | 7,400 | 231 |
| 67 | 36 | 50% | 4,200 | 237 |
| 83 | 51 | 20% | 3,600 | 238 |
| 100 | no polymer recovered | | | |

*Yield based on weight of recovered polymer to combined weight of isomers.

EXAMPLE 8

This Example serves to illustrate the processability and mechanical properties of polymers of exo NMD.

Poly(exo NMD) was prepared essentially as in Example 4 from 150 9 of exo NMD except that antioxidants were added to the polymerization solution prior to precipitating the polymer. The antioxidants were 1.5 g. of hindered phenol (Irganox 1076 from Ciba-Geigy) and 0.75 g. of tris nonyl phenyl phosphate (Polygard from Uniroyal, Inc.) dissolved in 25 ml. of 1,2-dichloroethane and 10 ml. of methanol. Solvent was evaporated from the solution and the resulting polymer was extracted from methanol and dried overnight in a vacuum oven at 60°. The polymer was molded at 300° into specimen bars that were used for mechanical property analysis. The results of this mechanical property analysis are reported in Table 2. The Notched Izod Impact resistance was determined on a 3 mm (⅛ inch) thick bar.

TABLE 2

| Mechanical Property Analysis of Poly(exo-NMD) | | |
|---|---|---|
| Tensile Strength | 750 Kg/cm$^2$ | (10,660 psi) |
| Elongation | 1.14% | |
| Flexural Strength | 1460 Kg/cm$^2$ | (20,800 psi) |
| Flexural Modulus | 32,300 Kg/cm$^2$ | (460,000 psi) |
| Notched Izod Impact | 3.3 J/m | (0.6 ft-lb/in) |
| HDTUL at 18.5 Kg/cm$^2$ | 184° | |

EXAMPLE 9

This example serves to illustrate the effect of molecular weight on the $T_g$ of the polymers of exo NMD.

Exo NMD was polymerized essentially as in Example 4 using 2 g of exo NMD in 2 ml of 1,2-dichloroethane, 0.1 ml of catalyst solution, 0.17 ml of activator solution and hexene-1 as a chain terminator in the amount (mole percent per NMD and hexene-1) indicated in Table 3.

TABLE 3

| mole % hexene-1 | $M_n$ | $T_g$ |
|---|---|---|
| 0 | 62,000 | 217 |
| 5 | 16,000 | 211 |

TABLE 3-continued

| mole % hexene-1 | $M_n$ | $T_g$ |
| --- | --- | --- |
| 10 | 12,000 | 200 |
| 20 | 6,400 | 182 |
| 40 | 7,100 | 185 |

EXAMPLE 10

This example serves to illustrate the preparation of a graft polymer of NDI onto a rubber substrate.

15 grams of a nitrile rubber (obtained from The B. F. Goodrich Company as Hycar 1042, 33% acrylonitrile stripped of antioxidants by dissolving in toluene and recovered from methanol) was dissolved in 250 ml of 1,2-dichloroethane. 135 g of exo NMD, 3.4 ml of the catalyst solution and 5.6 ml of the activator solution as used in Example 4 was added to the dissolved rubber solution under a reduced oxygen atmosphere (1 ppm $O_2$). The resulting mixture was stirred at 60°–65° C. for 3 hours, then cooled. Antioxidants were added and the polymer recovered in the manner of Example 8 exhibited a $T_g$ of 220°. Sample bars for mechanical analysis were molded at 300°. The results of mechanical property analysis are reported in Table 4. The Notched Izod Impact resistance was determined on a 3 mm (⅛ inch) thick bar. Attempts to separate the rubber from the poly (NMD) by chloroform and toluene extraction were unsuccessful indicating a graft polymer.

TABLE 4

| Mechanical Property Analysis of Rubber-modified Polymer) | | |
| --- | --- | --- |
| Tensile Strength | 650 Kg/cm$^2$ | (9,200 psi) |
| Elongation | 9.7% | |
| Flexural Strength | 1200 Kg/cm$^2$ | (17,000 psi) |
| Flexural Modulus | 27,600 Kg/cm$^2$ | (393,000 psi) |
| Notched Izod Impact | 130 J/m | (2.4 ft-lb/in) |
| HDTUL at 18.5 Kg/cm$^2$ | 180° | |

EXAMPLE 11

This example serves to illustrate the preparation of copolymers of exo NMD and norbornene nitrile (NN). 3 g of exo NMD and NN (in the ratio reported in Table 5) was dissolved in 6 ml of dichloro-ethane in a reaction vial. Each vial was injected with 0.15 ml of the catalyst solution and 0.25 ml of the activator solution utilized in Example 4. The reaction mixtures were held at about 60° for about 4 hours. The resulting polymers were precipitated in methanol, filtered and dried for about 16 hours in a vacuum oven at 60°. The $M_n$ (determined by gel permeation chromatography) and $T_g$ for each polymer is reported in Table 5.

TABLE 5

| | Copolymer of NMD and NN | | |
| --- | --- | --- | --- |
| | % NMD | $M_n$ | $T_g$ |
| A | 100 | 62,000 | 216 |
| B | 83.3 | 28,000 | 203 |
| C | 75 | 36,000 | 195 |
| D | 66.6 | 45,000 | 186 |
| E | 50 | — | 174 |
| F | 33.3 | — | 161 |
| G | 0 | — | 130 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A method for preparing polymers of N-methyl norbornene dicarboximide having a glass transition temperature of at least 210° C., said method comprising mixing a ring-opening polymerization catalyst with a mixture of endo and exo N-methyl norbornene dicarboximide monomers.

2. A method according to claim 1 wherein said polymers are prepared by bulk polymerization of a molten mixture of said monomers.

* * * * *